(12) United States Patent
Martinerie et al.

(10) Patent No.: US 10,707,950 B2
(45) Date of Patent: Jul. 7, 2020

(54) RELAY PLATFORM FOR COMMUNICATING TELEMETRY DATA FROM ONE OR MORE MOVING OBSERVATION SATELLITE(S) TO THE GROUND

(71) Applicant: THALES, Courbevoie (FR)

(72) Inventors: Francis Martinerie, Toulouse (FR); Hervé Sainct, Toulouse (FR); Serge Taride, Toulouse (FR); Jean Didier Gayrard, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/467,959

(22) PCT Filed: Oct. 12, 2017

(86) PCT No.: PCT/EP2017/076065
§ 371 (c)(1),
(2) Date: Jun. 8, 2019

(87) PCT Pub. No.: WO2018/103926
PCT Pub. Date: Jun. 14, 2018

(65) Prior Publication Data
US 2020/0076495 A1   Mar. 5, 2020

(30) Foreign Application Priority Data

Dec. 8, 2016 (FR) ..................................... 16 01749

(51) Int. Cl.
*H04B 7/185* (2006.01)
*H04L 29/06* (2006.01)

(52) U.S. Cl.
CPC ..... *H04B 7/18504* (2013.01); *H04L 63/0428* (2013.01)

(58) Field of Classification Search
None
See application file for complete search history.

(56) References Cited

U.S. PATENT DOCUMENTS

| | | | | |
|---|---|---|---|---|
| 6,151,308 A | * | 11/2000 | Ibanez-Meier | .... H04B 7/18508 370/316 |
| 2011/0015852 A1 | * | 1/2011 | Blomenhofer | ....... G08G 5/0052 701/120 |
| 2014/0225769 A1 | * | 8/2014 | Akcasu | .................. G01S 19/03 342/357.4 |

(Continued)

FOREIGN PATENT DOCUMENTS

WO    2016/026023 A1    2/2016

*Primary Examiner* — Clemence S Han
(74) *Attorney, Agent, or Firm* — Baker & Hostetler LLP

(57) ABSTRACT

A relay platform for communicating telemetry data from one or more moving observation satellite(s) to the ground is provided. The relay platform for communicating from a space observation system, installed on board an aircraft moving above the clouds, comprises a first reception interface for demodulating telemetry data from at least one moving observation satellite, a second transmission interface for modulating and transmitting the data received to at least one destination ground station. The relay platform comprises a first descending two-level decryption/encryption chain for the telemetry data returned from at least one moving observation satellite(s) to the destination ground station(s).

14 Claims, 10 Drawing Sheets

(56) References Cited

U.S. PATENT DOCUMENTS

2015/0204974 A1    7/2015  Pillay
2016/0119938 A1*  4/2016  Frerking ............... H04W 80/06
                                                      370/316

* cited by examiner

US 10,707,950 B2

RELAY PLATFORM FOR COMMUNICATING TELEMETRY DATA FROM ONE OR MORE MOVING OBSERVATION SATELLITE(S) TO THE GROUND

CROSS-REFERENCE TO RELATED APPLICATIONS

This application is a National Stage of International patent application PCT/EP2017/076065, filed on Oct. 12, 2017, which claims priority to foreign French patent application No. FR 1601749, filed on Dec. 8, 2016, the disclosures of which are incorporated by reference in their entirety.

FIELD OF THE INVENTION

The present invention concerns communication platforms acting as relays for transmitting data, at high throughput, between one or more moving, i.e. non-geostationary, observation satellite(s), and one or more ground stations receiving said observation data, referred to hereinafter as telemetry data from the observation satellites.

The present invention also concerns observation systems using such communication platforms as relays.

BACKGROUND

It is known that one of the factors limiting observation systems using non-geostationary moving satellites is the capacity of the downlink of a moving satellite to downlink all the images taken by the satellite to the receiving ground station or stations when said moving satellite is passing over said receiving ground station with the latter geometrically visible from said satellite.

In recent decades, in order to increase the downlink capacity of each of the moving satellites, there has been an increase in the frequencies used for downlinks in satellite observation systems, which are now moving towards the X and Ka bands, in order to be able to convey and downlink increasing amounts of image data during the given time period of the satellite's pass when it is visible from the station.

Existing projects aim to continue this move towards optical frequencies, which would allow yet more telemetry data to be downloaded in the given time period during which the satellite is flying over the receiving ground station.

However, starting in the very high frequency radio bands, i.e. above the UHF band, attenuation due to the presence of clouds in the atmosphere significantly limits throughput, and this attenuation becomes prohibitive for optical links.

One solution that makes it possible to use higher frequencies on the downlink consists in using a communication relay platform, installed on board an aircraft, for example a drone or balloon, traveling at high altitude above the clouds, helping eliminate the prohibitive attenuation of radio signals caused by the clouds, which then only affect retransmission between the communication platform and the receiving ground station, which retransmission takes place over a much shorter distance (a few to several tens of kilometers rather than several hundred to thousands of kilometers) and in a location allowing the use of specific allocations of transmission frequencies and bands, with the further major advantage of being able to be permanent.

Despite the existence of regulatory requirements for the bands that can be used between high-altitude relays and the ground, and although these bands are not necessarily advantageous in terms of accessible throughput, these usable bands are less congested than the bands allocated to satellites.

Using a high-altitude relay as the relay between the ground and moving satellites is highly beneficial because, since the relay is above the clouds, an optical downlink between the moving satellite and the high-altitude relay platform allows high-throughput communications with 100% availability during the satellite's pass when it is visible from the relay, typically a few minutes to approximately ten minutes in the case of low orbit satellites. The second downlink between the relay platform and the receiving ground station can be a radio frequency downlink in a frequency band less sensitive to clouds and rainfall, with a smaller throughput compensated for by permanent visibility. Whereas a moving observation satellite spends approximately 40 minutes per day visible to a ground station, the high-altitude relay allows an improvement of a factor of more than 30 in terms of the throughput required from the relay station to the ground.

Patent application U.S. Pat. No. 6,151,308 A describes a satellite system using high-altitude relay platforms that make it possible to define communication cells more precisely, and avoid obstructions in satellite links between terminals and satellites moving in a low orbit, in particular when terminals are located in an urban environment, thus allowing a greater number of terminals to access the network of the communications system. Patent application U.S. Pat. No. 6,151,308 A describes an advantageous use of the satellite system in the context of an observation mission that makes it possible to obtain finer and higher resolution images by installing the observation instruments on high-altitude relay platforms rather than moving satellites. Document U.S. Pat. No. 6,151,308 A does not describe the use of a communication relay platform to help return voluminous telemetry data from moving observation satellites and does not describe how the security of transmissions is managed at the satellite observation system, and in particular at the communication relay platform, in the case of relays with a plurality of satellites and/or multiple receiving ground stations.

A first technical problem is that of providing an architecture for integrating security functions, at the satellite observation system and in particular at the communication relay platform, that simplifies how the security of transmissions is managed in the case of a plurality of satellites and/or multiple receiving ground stations.

A second technical problem is that of increasing the availability and capacity of the downlink from the relay platform to the ground station in order to overcome a prohibitive drop in throughput or an absence of downlink between the relay platform and the ground station caused, for example, by interference from clouds that are highly absorbent with regard to radiation.

SUMMARY OF THE INVENTION

To this end, the invention concerns a communication relay platform of a space observation system, configured to be installed on board an aircraft moving above the clouds, and configured to act as a high-altitude relay for transmitting space observation data, referred to as telemetry data, at a high throughput, between at least one non-geostationary moving observation satellite and at least one target ground station for receiving said data, the transmission from the observation satellite or satellites to the high-altitude relay being capable of taking place during one or more predetermined visibility windows when the moving observation satellite or satellites is visible to the aircraft, and the transmission of data from the aircraft to the ground being capable of taking place constantly. The relay platform comprises a first receiving antenna configured to receive, in a first optical or radio frequency band observation data transmitted over a first wireless space downlink linking at least one moving observation satellite to the relay platform, and a first reception interface, connected to the first receiving antenna and configured to demodulate the data received by the first antenna and save it in a memory, and a second transmission interface, configured to modulate the observation data stored in the memory, and transmit said modulated data in a second radio frequency band via a second transmission antenna over a second wireless aerial downlink directly linking the relay platform to at least one target ground station. The relay platform is characterized in that it comprises a first descending two-level decryption/encryption chain for the telemetry data returned from at least one moving observation satellite to the target ground station or stations.

According to specific embodiments, the communication relay platform comprises one or more of the following features:

the first frequency band of the first wireless space downlink is an optical or radio frequency band, and/or the second frequency band of the second aerial downlink is an optical or radio frequency band;

the relay platform further comprises a third reception interface configured to demodulate secure telecommand data of the relay platform and/or of the moving observation satellite(s), generated and transmitted over a third dedicated link by a ground control center of the space observation system;

the first descending two-level decryption/encryption chain is configured:

for each moving observation satellite and the corresponding received telemetry data, to decrypt, at a first descending level, said telemetry data, encrypted and transmitted by said moving observation satellite over the first space downlink and demodulated by the first interface, by using active keys for decrypting the telemetry data of the first descending level, associated with said moving satellite and with indices of active keys for encrypting/decrypting the telemetry data of the first descending level, said indices of active encryption/decryption keys being transmitted together with said encrypted telemetry data and being associated, in a unique manner, with said moving observation satellite and with said active decryption keys of the first descending level; then for each target ground station and the corresponding telemetry data intended for same, decrypted at the first descending level and originating from one or more observation satellites, to encrypt, at a second descending level, the telemetry data decrypted at the first descending level by using an active key for encrypting the telemetry data of the second descending level, associated with said target ground station, and to append, to said encrypted data of the second descending level, an index of an active key for encrypting/decrypting the telemetry data of the second descending level, associated, in a unique manner, with said target ground station and with said active encryption key of the second descending level;

the first descending two-level decryption/encryption chain for the telemetry data, returned from the moving satellite(s) to the target ground station(s), comprises a first module for managing the descending two-level encryption/decryption keys, a second module for decrypting, at a first descending level, the telemetry data transmitted over the first space downlink and demodulated by the first interface, and a third module for encrypting, at a second descending level, the telemetry data decrypted at the first descending level; and the first module for managing the descending two-level encryption/decryption keys for the telemetry data is configured to initially receive a first group of one or more sets of keys for decrypting telemetry data of the first descending level, and to initially receive a second group of one or more sets of keys for encrypting telemetry data of the second descending level; and each set of keys for decrypting telemetry data concerning the first descending level is associated with a moving observation satellite, and each key for decrypting telemetry data at the first descending level of each set is paired with and identified in a unique manner by an index of an encryption/decryption key of the first descending level; and each set of keys for encrypting telemetry data concerning the second descending level is associated with a target ground station, and each key for encrypting telemetry data at the second descending level of each set is paired with and identified in a unique manner by an index of an encryption/decryption key at the second descending level;

the first module for managing the descending two-level encryption/decryption keys for the telemetry data is configured to execute, on receipt, via the third interface, of dedicated telecommands secured and sent by the ground control center, modifications of part or all of the keys for decrypting the telemetry data at the first descending level and/or the keys for encrypting telemetry data at the second descending level;

the first receiving antenna, the first reception interface and the memory are configured to separately receive, demodulate and save telemetry data, encrypted at the first descending level and transmitted by at least two non-geostationary moving observation satellites over the first space downlink, and/or the second transmission antenna and the second transmission interface are configured to separately modulate and transmit the telemetry data encrypted at the second descending level to at least one target ground station over the second wireless aerial downlink; and the first descending two-level decryption/encryption chain for the telemetry data, returned from the moving satellite(s) to the target ground station(s), comprises a matrix allocator for allocating the decrypted telemetry data, received from a given moving observation satellite, to different target ground stations, according to an allocation table loaded with telecommands, the matrix allocator being connected in series between the second decryption module and the third encryption module;

the relay platform further comprises a second ascending two-level decryption/encryption chain for the telecommand data of the moving observation satellite(s) received via the third reception interface of the third dedicated link for secure telecommands originating from the ground control center;

the second ascending two-level decryption/encryption chain for the telecommand data of the moving observation satellite(s) is configured:

for each moving target observation satellite and the corresponding telecommand data of said satellite, to decrypt, at a first ascending level, the telecommand data transmitted by the ground control center over the third link and demodulated by the third interface, by using an active key for decrypting the telecommand data of the first ascending level, associated with said observation satellite and with an index of an active key for encrypting/decrypting the telecommand data of the first ascending level, said index of the active key for encrypting/decrypting the telecommand data being transmitted together with the encrypted telecommand data by the ground control center and being associated, in a unique manner, with the moving satellite and with said decryption key of the first ascending level; then for each moving target observation satellite and the decrypted telecommand data intended for it, to encrypt, at a second ascending level, the telecommand data decrypted at the first ascending level by using an active key for encrypting the telecommand data of the second ascending level, the active key for encrypting the telecommand data of the second ascending level being associated with the target observation satellite, and to append, to said telecommand data of the second ascending level, an index of an active key for encrypting/decrypting telecommands, associated, in a unique manner, with said observation satellite and with said active encryption key of the second ascending level;

the relay platform further comprises a fourth transmission interface, configured to modulate telecommand data of at least one moving observation satellite, and transmit said modulated telecommand data via a fourth transmission antenna over a fourth wireless space uplink directly linking the relay platform to the moving observation satellite(s); and in which the second ascending two-level decryption/encryption chain for the telecommand data of the moving observation satellite(s) comprises a fourth module for managing the ascending two-level encryption/decryption keys, a fifth module for decrypting, at a first ascending level, the telecommand data transmitted over the third link and demodulated by the third interface, and a sixth module for encrypting, at a second ascending level, the telecommand data decrypted at the first ascending level; and the fourth module for managing the ascending two-level encryption/decryption keys for the telecommands of the moving satellite(s) is further configured to:

initially receive a third group of one or more sets of keys for decrypting telecommands of the first ascending level, and initially receive a fourth group of one or more sets of keys for encrypting telecommands of the second ascending level; and each set of keys for decrypting telecommands concerning the first ascending level is associated with a moving observation satellite, and each key for decrypting telecommand data at the first ascending level of each set is paired with and identified in a unique manner by an index of an encryption/decryption key of the telecommand data at the first ascending level; and each set of keys for encrypting telecommands concerning the second ascending level is associated with a moving target observation satellite, and each key for encrypting telecommand data at the second ascending level of each set is paired with and identified in a unique manner by an index of an encryption/decryption key at the second ascending level;

the fourth module for managing the two-level encryption/decryption keys for the telecommand data of the moving satellite(s) is configured to execute, on receipt, via the third interface, of dedicated telecommands secured and sent by the ground control center, modifications of part or all of the keys for decrypting the telecommand data at the first ascending level and/or the keys for encrypting telecommand data at the second ascending level;

the relay platform further comprises a fifth transmission interface, configured to modulate the observation data stored in the memory, and to transmit said modulated data in a fifth optical or radio frequency band, via a fifth transmission antenna, over a fifth wireless space uplink directly linking the relay platform to a geostationary satellite, the memory being configured to route the telemetry data, in a manner controlled from the ground by sending a dedicated command, over the fifth transmission interface, instead of the second transmission interface which is taken as the destination port in a nominal mode.

The invention also concerns a space system comprising at least one non-geostationary moving observation satellite, at least one target ground station for receiving observation data transmitted at a high throughput by the at least one observation satellite, an aircraft moving at an altitude higher than the clouds, and a communication relay platform, installed on board the aircraft and acting as a relay for transmitting the observation or telemetry data between the at least one observation satellite and the at least two target ground stations for receiving the data, in which the communication relay platform is defined according to the features described above, and the aircraft is included in the group made up of drones, steerable stratospheric balloons or airplanes.

According to specific embodiments, the space system further comprises a geostationary satellite and at least one remote and offset ground station, connected to said geostationary satellite by a geostationary space downlink, and the relay platform comprises a fifth transmission interface, configured to modulate the observation data stored in the memory, and to transmit, in a fifth optical or radio frequency band, said modulated data via a fifth transmission antenna over a fifth wireless space uplink directly linking the relay platform to a geostationary satellite, the memory being configured to route the telemetry data, in a manner controlled from the ground by sending a dedicated command, over the fifth transmission interface, instead of the second transmission interface which is taken as the destination port in a nominal mode.

The invention will be more clearly understood upon reading the description of several embodiments that follows, which is provided purely as a non-limiting example, with reference to the drawings in which:

Generally, a satellite observation system according to the invention uses a high-altitude communication relay platform that is installed on board an aircraft moving above the clouds, for example a drone or a stratospheric balloon, and that makes it possible to increase the capacity to downlink telemetry data from moving satellites to the ground.

The relay platform is configured to relay the data directly to at least one target ground station that is permanently visible to the aircraft, either with a throughput identical to the throughput of the downlink between the observation satellite and the relay platform, or with a smaller throughput by means of a buffer memory on board the relay platform, which is made possible by the orbital geometry of the moving observation satellites, which implies short download windows spaced apart by idle time periods.

DETAILED DESCRIPTION

The result is an increase in potential throughput, and therefore in the observation service, for example imagery or other observation data (radar, radio frequency RF, etc.), of the order of 150% and capable of exceeding 1000%.

Moreover, the relay platform can be used for contexts in which data from a plurality of satellites is transmitted to a plurality of ground stations.

The basic concept of the invention that solves the first technical problem, i.e. that of providing an architecture for integrating the security functions into the satellite observation system, that is simplified and compatible with transmissions when constellations of multiple satellites and/or receiving ground stations are concerned, is based on maximizing the integration of the security functions and managing the secure links of the space observation system within the communication relay platform.

Figure 1:
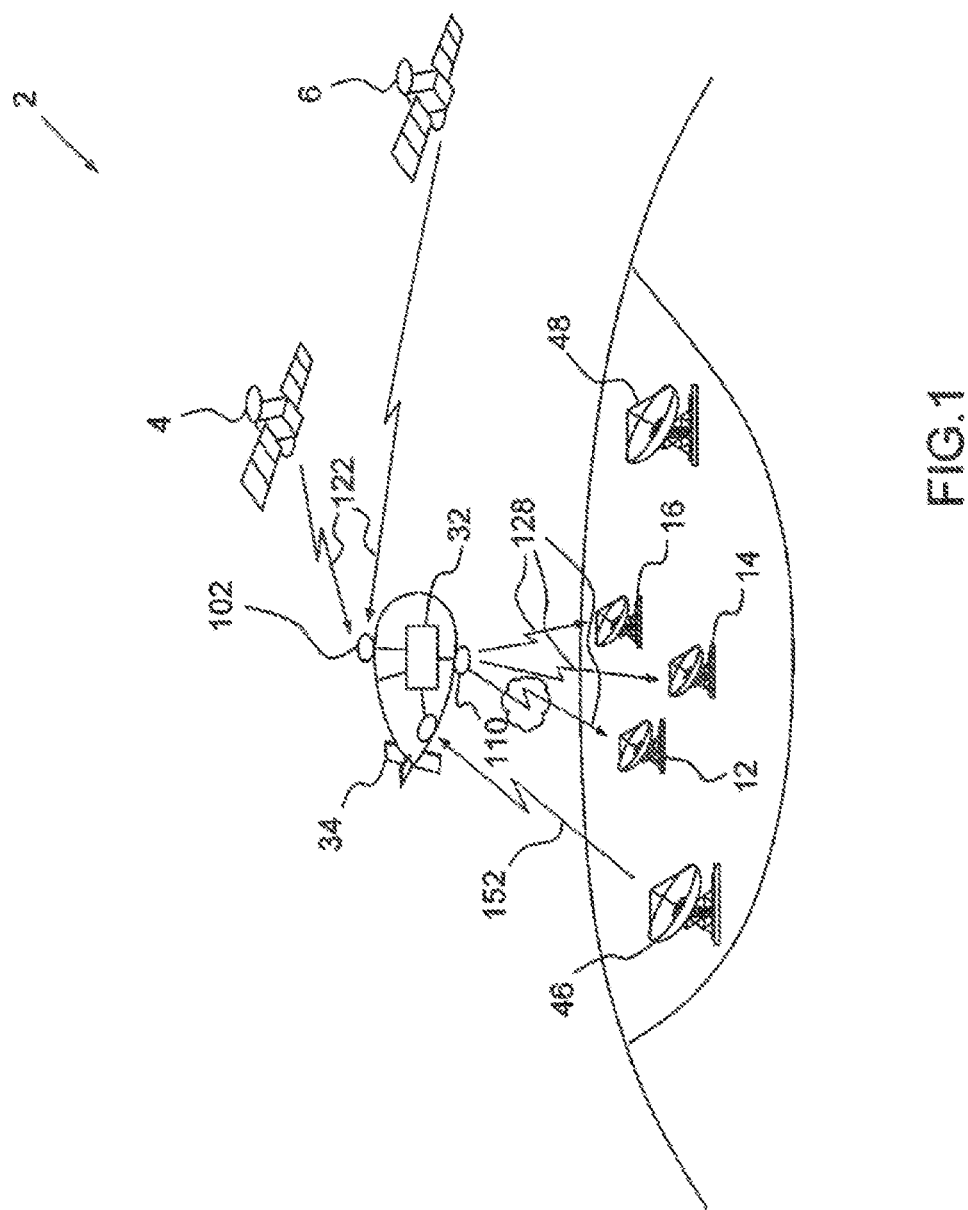
FIG. 1 is a general view of a space system according to the invention using a relay platform installed on board an aircraft being piloted above the clouds.

According to FIG. 1 and one embodiment of the invention, a space observation system 2 comprises:

at least one non-geostationary moving observation satellite, in this case two observation satellites 4 and 6, at least two target ground stations 12, 14, 16 for receiving observation data transmitted at a high throughput by the at least one observation satellite 4, 6, a communication relay platform 32, installed on board an aircraft 34 and acting as a relay for transmitting the observation data, also referred to here as observation telemetry data, between the at least one moving observation satellite 4, 6 and the target ground stations 12, 14, 16 for receiving the observation data, the aircraft 34 transporting the relay platform 32, a first control center 46 for controlling the relay platform 32, and a second control center 48 for controlling the moving observation satellites 4, 6.

The aircraft 34 is included in the group made up of drones, steerable balloons or airplanes. In this case, in FIG. 1, the aircraft 34 shown is a steerable stratospheric balloon.

The aircraft 34 is configured and piloted in order to move above atmospheric water clouds, this making it possible to establish space downlinks from the observation satellites 4, 6 to the aircraft 34 and, if required, uplinks from the relay platform 32 to observation satellites 4, 6, for example in an optical band or a high-frequency radio band RF.

The aircraft 34 is piloted above the clouds in such a way as to be located as close as possible to and within optical visibility of the target and receiving ground stations 12, 14, 16, referred to as "local stations", and avoid attenuations caused by possible atmospheric elements such as atmospheric clouds.

Generally, the atmospheric elements forming a screen to radiation are mainly water clouds but can also be sandstorms or clouds formed by atmospheric pollutants, depending on the regions of the Earth concerned.

Figure 2:
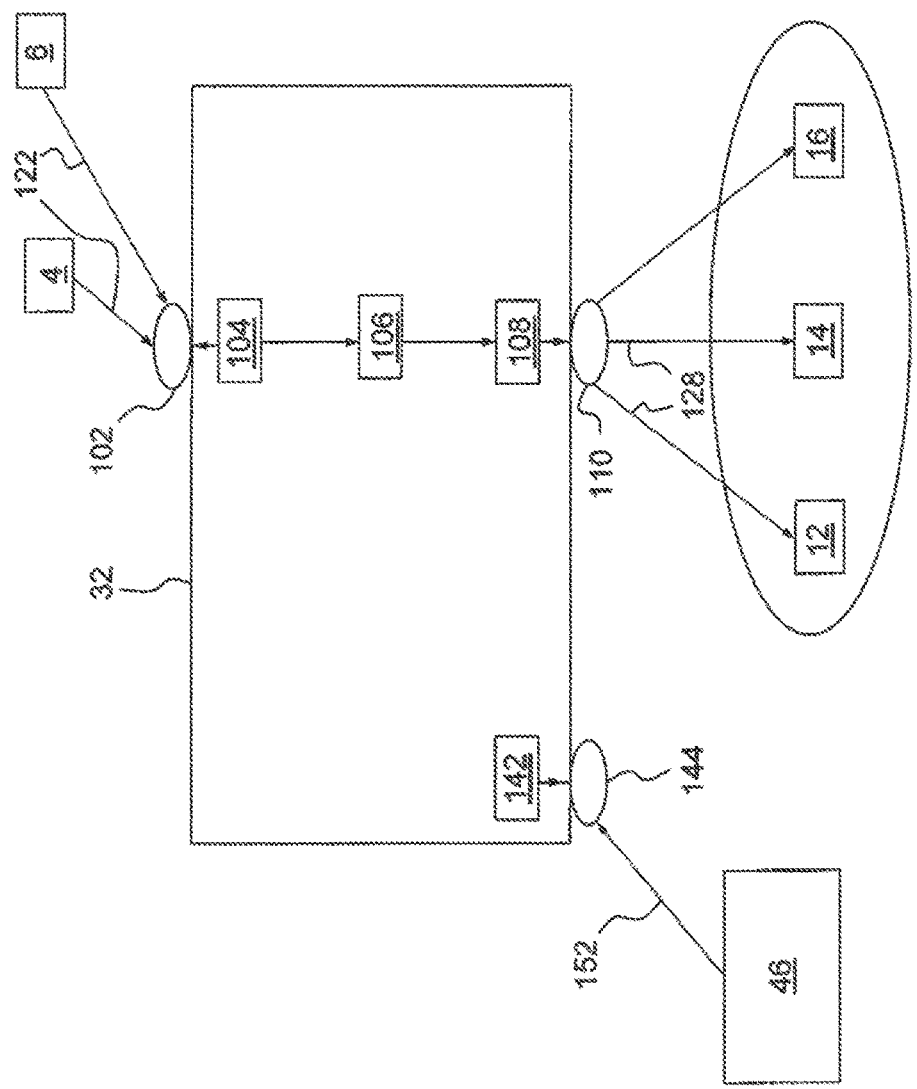
FIG. 2 is a view of the general architecture of the relay platform of the invention and its main interfaces with the other elements of the space observation system of FIG. 1.

According to FIG. 2 and a general example of the architecture of the relay platform according to the invention, the communication relay platform 32 of FIG. 1 is configured to be installed on board the aircraft 34, piloted in order to move above the clouds, and it is configured to support environmental conditions associated with the environment in which the aircraft 34 is moving, for example the stratosphere, in the case of a stratospheric balloon.

The relay platform 32 is configured to act as a relay for transmitting, at a high throughput, observation or telemetry space data between one or more non-geostationary moving observation satellites, in this case the moving observation satellites 4 and 6, and at least one target ground station for receiving said data, in this case the target ground stations 12, 14, 16, the transmission taking place in one or more predetermined visibility windows when the moving observation satellite or satellites 4, 6 are visible to the aircraft 34.

The communication relay platform 32 comprises a first receiving antenna 102, a first reception interface 104, a buffer memory 106, a second transmission interface 108, and a second transmission antenna 110.

The first receiving antenna 102 is configured to receive, in a first optical or radio frequency band, observation data transmitted over a first wireless space downlink 122 linking at least one moving observation satellite to the relay platform 32.

The first reception interface 104, connected to the first receiving antenna 102, is configured to demodulate the telemetry data received by the first antenna 102 and save it in the memory 106.

The second transmission interface 108 is configured to modulate the observation or telemetry data stored in the memory 106, and transmit said modulated telemetry data in a second radio frequency band via the second transmission antenna 110 over a "local" second wireless aerial downlink 128, directly linking the relay platform 32 to at least one local target ground station, in this case the local target ground stations 12, 14 and 16.

The first frequency band of the first wireless space link 122 is an optical or radio frequency band, and/or the second frequency band of the second aerial link 128 is a radio frequency band.

According to FIG. 2, the relay platform 32 also comprises a third reception interface 142, configured to receive, through a third receiving antenna 144, and to demodulate secure telecommand data of the relay platform 32, generated and transmitted over a third dedicated link 152 by the ground control center 46 of the relay platform 32.

Figure 3:
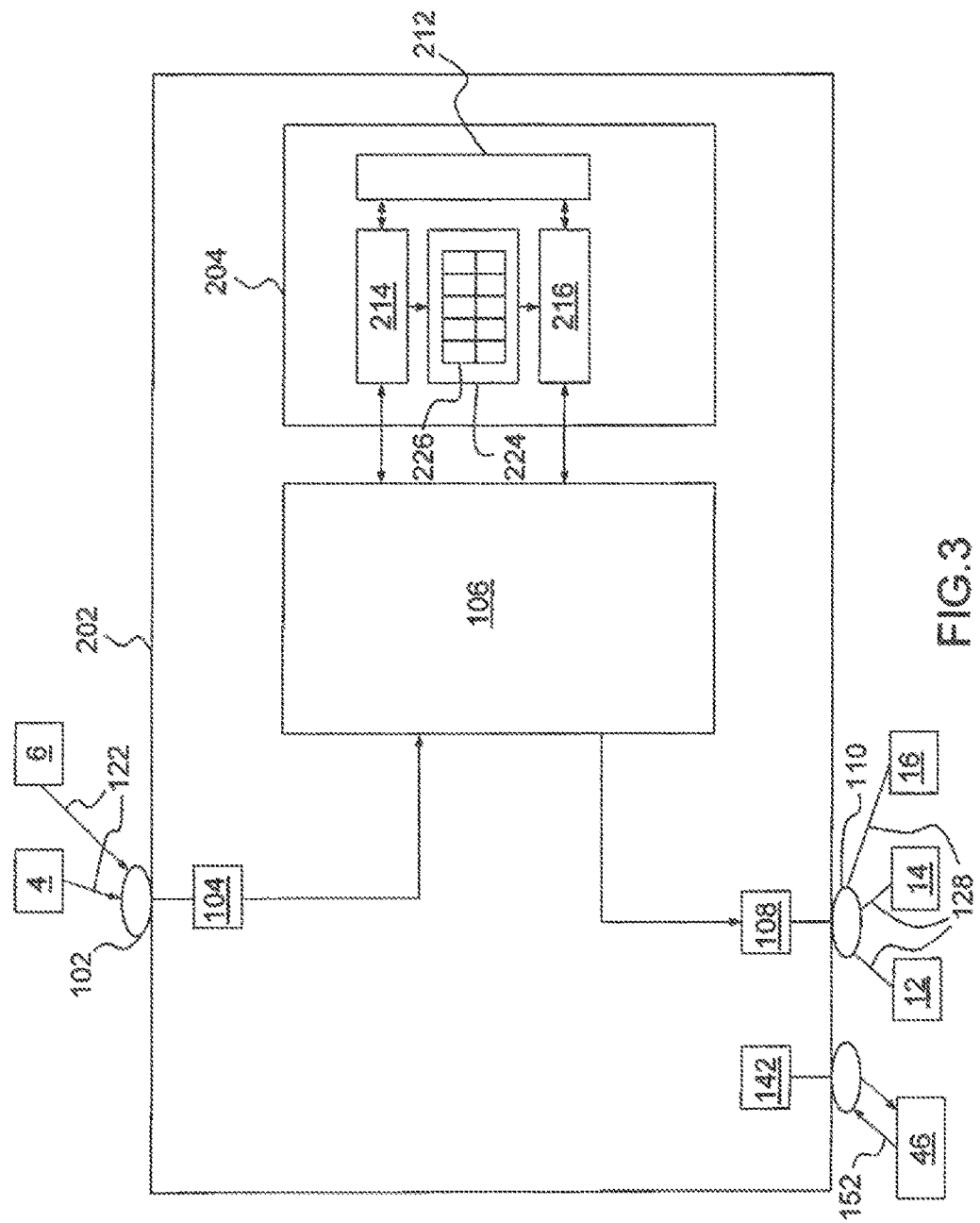
FIG. 3 is a view of a first embodiment of a relay platform according to the invention, derived from the general architecture of FIG. 2, that integrates, in an optimum manner, the security functions concerning the protection of the telemetry data descending from the moving observation satellites.

According to FIG. 3 and a first specific embodiment 202 of the relay platform 32 integrating the security functions, the relay platform 202 comprises a first descending two-level decryption/encryption chain 204 for the observation or telemetry data, returned from at least one moving satellite to the target ground station or stations, in this case the moving satellites 4 and 6.

The first descending two-level decryption/encryption chain 204 is configured:

for each moving observation satellite 4, 6 and the corresponding received telemetry data, to decrypt, at a first descending level, said telemetry data, encrypted and transmitted by said moving observation satellite over the first space downlink 122 and demodulated by the first interface 104, by using an active key for decrypting the telemetry data of the first descending level, associated with said moving satellite and with an index of an active key for encrypting/decrypting the telemetry data of the first descending level, said index of an active encryption/decryption key being transmitted together with said encrypted telemetry data and being associated, in a unique manner, with said moving satellite and with said active decryption key; then for each target ground station 12, 14, 16 and the corresponding telemetry data intended for same, decrypted at the first descending level and originating from one or more observation satellites 4, 6, to encrypt, at a second descending level, said decrypted telemetry data by using an active key for encrypting the telemetry data of the second descending level, associated with said target ground station, and to append, to said encrypted data of the second level, an index of an active key for encrypting/decrypting the telemetry data of the second descending level, associated, in a unique manner, with said target ground station and with said active encryption key.

It should be noted that sets of decryption and encryption keys, respectively for the first and second descending levels, and sets of indices of keys for telemetry data of the associated first and second levels, are previously loaded into the two-level decryption/encryption means 204 through the third reception interface 142 of the third dedicated link 152 for secure telecommands originating from the first ground control center 46. The activation of the keys is implemented within these sets of keys by telecommands of the indices of the active keys.

The first descending two-level decryption/encryption chain 204 for the telemetry data, returned from the moving satellite(s) 4, 6 to the target ground station(s) 12, 14, 16, comprises a first module 212 for managing the descending two-level encryption/decryption keys, a second module 214 for decrypting, at a first descending level, the telemetry data transmitted over the first space downlink 122 and demodulated by the first interface 104, and a third module 216 for encrypting, at a second descending level, the telemetry data decrypted at the first descending level.

The first module 212 for managing the descending two-level encryption/decryption keys for the telemetry data is configured to:

initially receive a first group of one or more sets of keys for decrypting telemetry data of the first descending level; and initially receive a second group of one or more sets of keys for encrypting telemetry data of the second descending level.

Each set of keys for decrypting telemetry data concerning the first descending level is associated with a moving observation satellite, and each key for decrypting telemetry data at the first descending level of each set is paired with and identified in a unique manner by an index of an encryption/decryption key at the first descending level.

Each set of keys for encrypting telemetry data concerning the second descending level is associated with a target ground station, and each key for encrypting telemetry data at the second descending level of each set is paired with and identified in a unique manner by an index of an encryption/decryption key at the second descending level.

The first module 212 for managing the descending two-level encryption/decryption keys for the telemetry data is configured to execute, on receipt, via the third interface 142, of dedicated telecommands secured and sent by the first ground control center 46, modifications of part or all of the keys for decrypting the telemetry data at the first descending level and/or the keys for encrypting telemetry data at the second descending level.

According to FIG. 3, the first receiving antenna 102, the first reception interface 104 and the memory 106 are configured to separately receive, demodulate and save observation or telemetry data, encrypted at the first descending level and transmitted by one or more non-geostationary moving observation satellites, in this case the observation satellites 4, 6, over the first space downlink 122.

The second transmission antenna 110 and the second transmission interface 108 are configured to modulate and transmit the telemetry data encrypted at the second descending level to the target ground station or stations 12, 14, 16 over the second wireless aerial downlink 128.

The first descending two-level decryption/encryption chain 204 for the telemetry data, returned from the moving satellite(s) 4, 6 to the target ground station(s) 12, 14, 16, in this case comprises a matrix allocator 224 for allocating the decrypted telemetry data, received from a given moving observation satellite, to different target ground stations, according to a predetermined allocation table 226.

The matrix allocator 224 is connected in series between the second decryption module of the first descending level 214 and the third encryption module of the second descending level 216.

The allocation table 226 is, in this case, a matrix with two rows and five columns for encoding with a predetermined inter-connectivity, that may be fixed or capable of being modified on command, between the observation satellites and the target ground stations, the row index encoding the level j of the observation satellite and the column index encoding the level k of the target ground station.

According to a first variant, it is possible to implement a broadcast of all the data returned from the observation satellites to all of the target ground stations, sorting being carried out at the target ground stations in this case.

According to a second variant, an instruction is provided for allocating the telemetry data, for example images, to such or such a target ground station, said instruction being contained in the meta data associated with the images and therefore received with said images by the relay platform. This allows image-by-image rather than satellite-by-satellite allocation.

The second and third modules 214, 216 are linked to the first module 212 via bidirectional links and are configured to search it respectively for the active decryption key of the first descending level and the active encryption key of the second descending level depending on the two corresponding indices of the active encryption/decryption keys previously received by telecommand.

The memory 106 can be managed according to several methods.

According to a first preferred method for managing the memory 106, the encrypted data, returned from the observation satellites 4, 6, is stored in encrypted form in the memory 106, then decrypted and encrypted before being sent to the target ground stations 12, 14, 16.

According to a second method for managing the memory 106, the encrypted data, returned from the observation satellites 4, 6, is first decrypted, then stored in decrypted form in the memory 106, and then encrypted before being sent to the target ground stations 12, 14, 16.

According to a third method for managing the memory 106, the encrypted data, returned from the observation satellites 4, 6, is successively decrypted and stored in decrypted form in the memory 106, then successively encrypted at the second descending level and stored in encrypted form in the memory 106 before being sent to the target ground stations 12, 14, 16.

Figure 4:
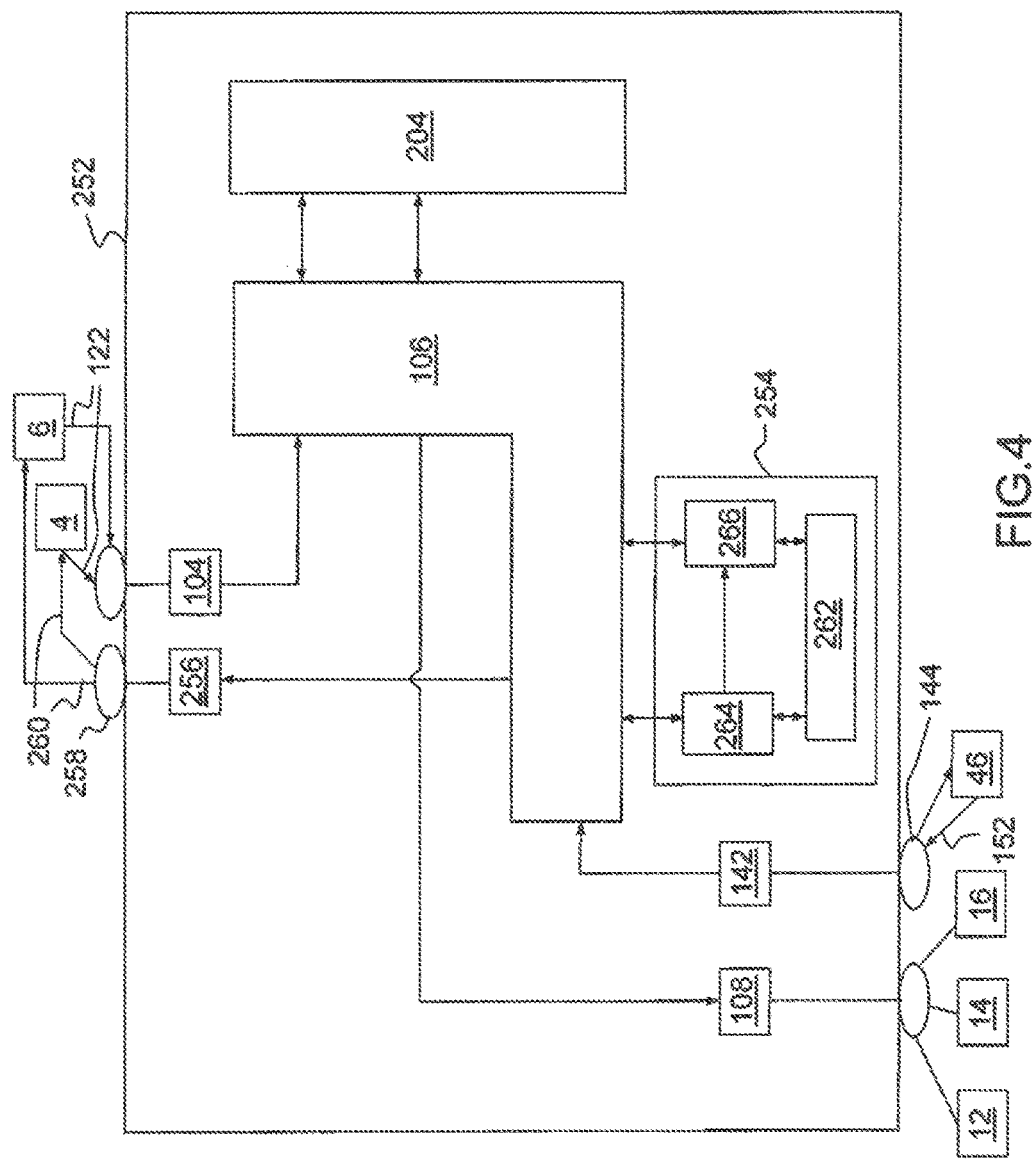
FIG. 4 is a view of a second embodiment of the relay platform according to the invention, derived from the first embodiment of FIG. 3, that also additionally integrates security functions concerning the protection of the ascending telecommands of the moving observation satellites.

According to FIG. 4 and a second specific embodiment 252 of the relay platform 32, the relay platform 252 is derived from the first embodiment 202 of the relay platform and comprises the same identically numbered components, in particular the first descending two-level decryption/encryption chain 204 for the telemetry data, returned from at least one moving satellite to the target ground station or stations, in this case the moving satellites 4 and 6.

The communication relay platform 252 further comprises a second ascending two-level decryption/encryption chain 254 for the telecommand data of the moving observation satellite(s), in this case the observation satellites 4, 6, received via the third reception interface 142 of the fourth dedicated link 152 for secure telecommands originating from the first ground control center 46.

The second ascending two-level decryption/encryption chain 254 for the telecommand data of the moving observation satellite(s) is configured:

for each moving target observation satellite 4, 6, and the corresponding telecommand data of said satellite, to decrypt, at a first ascending level, the telecommand data transmitted by the first ground control center 46 over the third link 152 and demodulated by the third interface 142, by using an active key for decrypting the telecommand data of the first ascending level, associated with said observation satellite and with an index of an active key for encrypting/decrypting telecommand data of the first ascending level, said index of the active key for encrypting/decrypting the telecommand data being transmitted together with the encrypted telecommand data by the first ground control center 46 and being associated, in a unique manner, with the moving satellite and with said active decryption key; then for each moving target observation satellite 4, 6, and the decrypted telecommand data intended for it, to encrypt, at a second ascending level, the telecommand data decrypted at the first ascending level by using an active key for encrypting the telecommand data of the second ascending level, the key for encrypting the telecommand data of the second ascending level being associated with the target observation satellite, and to append, to said encrypted telecommand data of the second ascending level, an index of an active key for decrypting the telecommand data, associated, in a unique manner, with said observation satellite and with said active encryption key of the second ascending level.

It should be noted that sets of decryption and encryption keys, respectively for the first and second ascending levels, are previously loaded into the ascending two-level decryption/encryption means 254 through the third reception interface 142 of the third dedicated link 152 for secure telecommands originating from the first ground control center 46. The activation of the keys is implemented via the indices of keys contained in telecommands.

According to FIG. 4, the communication relay platform 252 also comprises a fourth transmission interface 256, configured to modulate telecommand data of at least one moving observation satellite, and transmit said modulated telecommand data via a fourth transmission antenna 258 over a fourth wireless space uplink 260 directly linking the relay platform 252 to the moving observation satellite(s) 4 and 6.

The second ascending two-level decryption/encryption chain 254 for the telecommand data of the moving observation satellite(s) 4, 6 comprises a fourth module 262 for managing the ascending two-level encryption/decryption keys, a fifth module 264 for decrypting, at a first ascending level, the telecommand data transmitted over the third link 152 and demodulated by the third interface 142, and a sixth module 266 for encrypting, at a second ascending level, the telecommand data decrypted at the first ascending level.

The fourth module 262 for managing the ascending two-level encryption/decryption keys for the telecommands of the moving satellite(s) is configured to:

initially receive a third group of one or more sets of keys for decrypting telecommands of the first ascending level, and initially receive a fourth group of one or more sets of keys for encrypting telecommands of the second ascending level.

Preferably, the third group contains a single set of keys for decrypting telecommands of the first ascending level such that the encryption of the third ground-relay platform link 152 is independent of the observation satellites and such that the encryption by satellite is characterized at the relay platform. This makes the securing of the first uplink simpler to implement and more robust.

As a variant, the third group contains several sets of keys for decrypting telecommands of the first ascending level. In this case, each set of keys for decrypting telecommands concerning the first ascending level is preferably associated with a moving target observation satellite, and each key for decrypting telecommand data at the first ascending level of each set is paired with and identified in a unique manner by an index of an encryption/decryption key for the telecommand data at the first ascending level.

Each set of keys for encrypting telecommands concerning the second ascending level is associated with a moving target observation satellite, and each key for encrypting telecommand data at the second ascending level of each set is paired with and identified in a unique manner by an index of an encryption/decryption key at the second ascending level.

The fourth module 262 for managing the ascending two-level encryption/decryption keys for the telecommand data of the moving satellite(s) is configured to execute, on receipt, via the third interface 152, of dedicated telecommands secured and sent by the first ground control center 46, modifications of part or all of the keys for decrypting the telecommand data at the first ascending level and/or the keys for encrypting telecommand data at the second ascending level.

The fifth and sixth modules 264, 266 are linked to the fourth module 262 via bidirectional links and are configured to search it respectively for the active decryption key of the first ascending level and the active encryption key of the second ascending level depending on the two corresponding indices of the active encryption/decryption keys previously received by telecommand.

The memory 106 can be managed according to several methods.

According to a first preferred method for managing the memory 106, the encrypted data, returned from the observation satellites 4, 6, is stored in encrypted form in the memory 106, then decrypted and encrypted before being sent to the target ground stations 12, 14, 16.

According to a second method for managing the memory 106, the encrypted data, returned from the observation satellites 4, 6, is first decrypted, then stored in decrypted form in the memory 106, and then encrypted before being sent to the target ground stations 12, 14, 16.

According to a third method for managing the memory 106, the encrypted data, returned from the observation satellites 4, 6, is successively decrypted and stored in decrypted form in the memory 106, then successively encrypted at the second descending level and stored in encrypted form in the memory 106 before being sent to the target ground stations 12, 14, 16.

In any event, the telecommand data, decrypted at the first ascending level, of one or more moving satellites, contains the indices associated with the encryption key(s) for the telemetry data of the first descending level and the indices associated with the encryption/decryption keys of the second ascending level.

Only in the event of the keys being updated, the telecommand data, decrypted at the first ascending level, associated with a moving observation satellite, contains the keys for encrypting the telemetry data of the first space downlink, and the keys for decrypting the telecommand data of the fourth space uplink.

As a specific variant, a third embodiment of the relay platform is derived from the first embodiment 302. This third embodiment of the relay platform comprises the first descending two-level decryption/encryption chain 204 for the telemetry data shown in FIG. 3 but is not provided with the second ascending two-level decryption/encryption chain for the telecommand data of the moving observation satellites.

Therefore, the use of a communication relay platform, installed on board an aircraft chosen from drones, steerable stratospheric balloons and airplanes can contribute a specific solution to the securing of observation data, by transferring the functions of routing and managing data encryption/decryption, used by the different moving observation satellites and the target ground stations, bringing the management of the encryption and/or decryption keys and the decryption/encryption functions on board the relay platform.

Thus, the security functions integrated at a communication relay platform help simplify the management of the security of transmissions when constellations of multiple satellites and/or target ground stations are concerned.

The security functions concerning the management of keys, the decryption/encryption of telemetry data from the moving satellites and telecommands, if required, of the moving satellites make it possible to:

simplify the management of the satellite keys, and transfer the complexity of managing the moving satellites to the aircraft, and of managing the satellite/ground links to the links of the ground-drone control segment;

manage, from the relay platform, the security of several moving observation satellites, manage, on board the relay platform, the distribution of data from a given satellite, downlinked in encrypted form with a single key, to several users having different keys.

Figure 5:
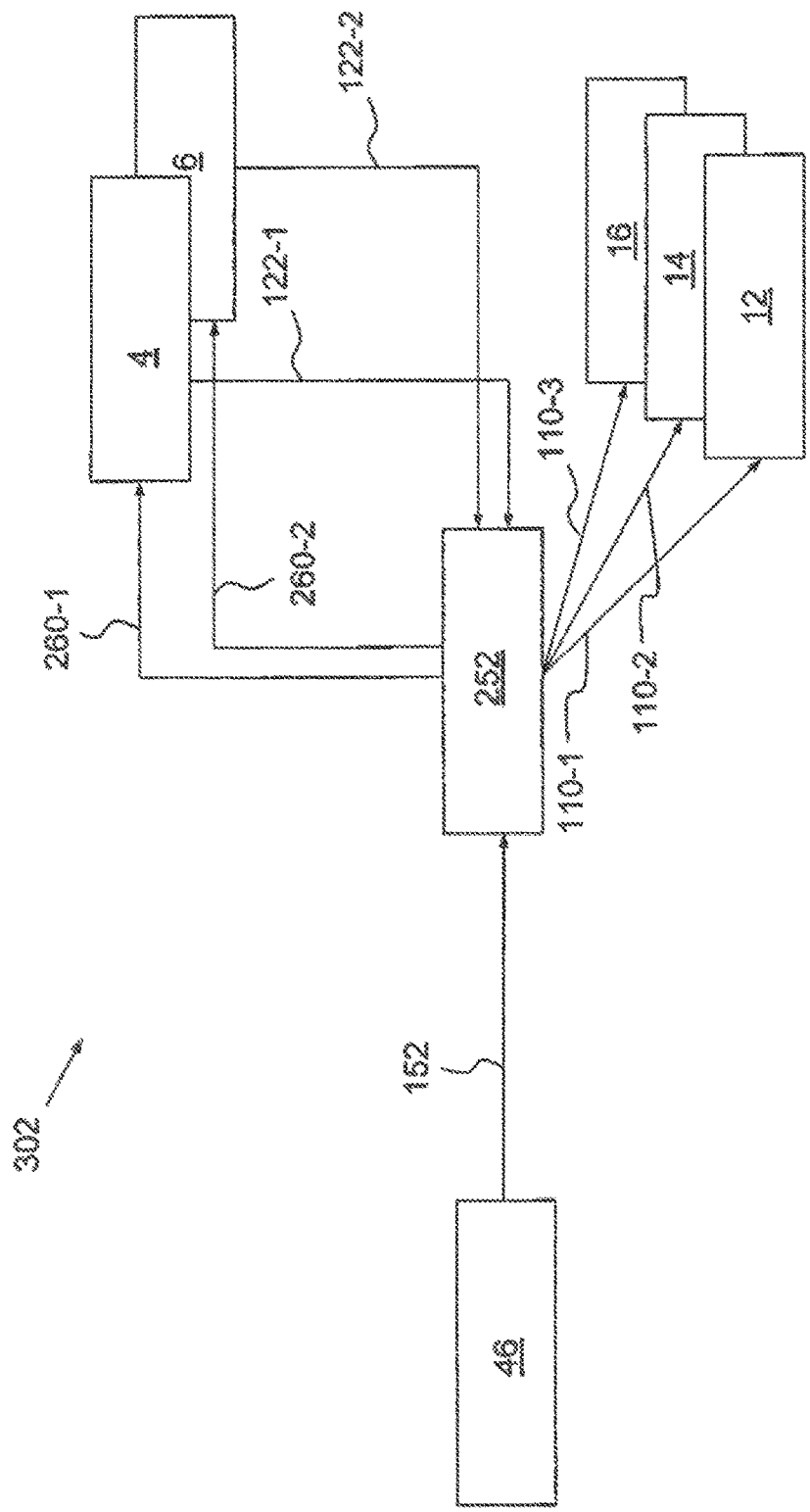
FIG. 5 is a general view of the communications architecture of the space observation system of FIG. 1, integrating the security functions and corresponding to the second embodiment of the relay platform of FIG. 4, the relay platform integrating the securing of the telemetry data and telecommands of the moving observation satellites, and directly receiving the telecommands of the observation satellites from a ground control center.

According to FIG. 5 and a communications architecture 302 of the observation system 2 of FIG. 1, the communication system 302 of the observation system uses a relay platform 252 according to the second embodiment of FIG. 4 which integrates, to a high degree, the functions of securing the telemetry and telecommand data of the observation satellites 4, 6.

In this architecture, the downlinking of secure telemetry data from the observation satellites to the local target stations 12, 14, 16 takes place through two-level links combining, as required, a downlink for telemetry data of the first level 122-1 or 122-2 and a downlink for telemetry data of the second level chosen from the links 110-1, 110-2 and 110-3.

In this architecture, the uplinking of secure telecommands of the observation satellites, from the first ground control center 46 to the observation satellites 4, 6 takes place via the relay platform 252 through two-level links combining, as required, the first uplink 152 of the first level and a link 260-1 or 260-2 of the two-level uplink for telecommands of the second level.

Figure 6:
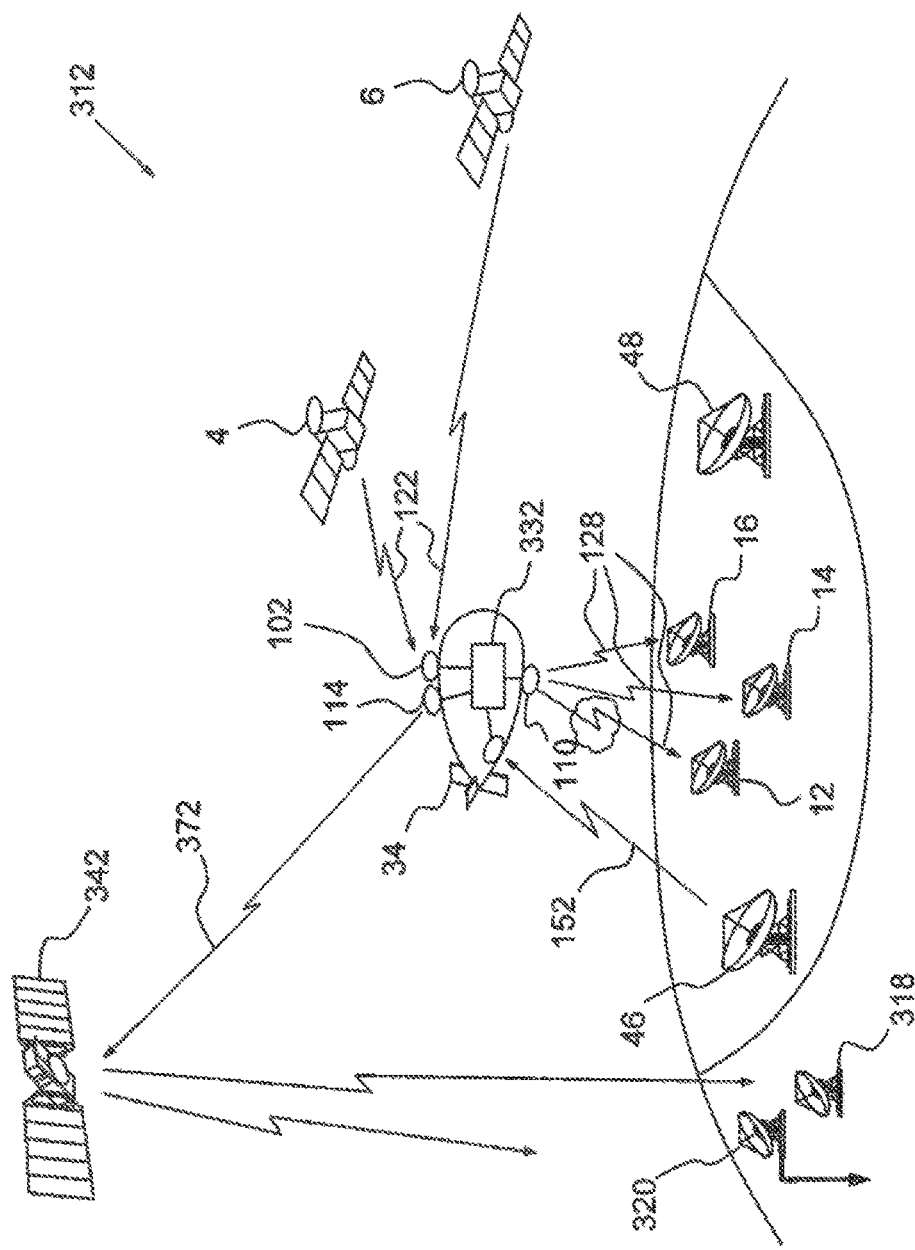
FIG. 6 is a view of a specific embodiment of the space system of FIG. 1 that primarily uses a relay platform installed on board an aircraft being piloted above the clouds, and additionally uses a geostationary satellite as a second relay.

According to FIG. 6 and a variant 312 of the space observation system 2 of FIG. 1, the space observation system 312 comprises the same elements as the space observation system and additionally comprises:

at least one "remote or offset" target ground station 318, 320 for receiving observation data transmitted at a high throughput by the at least one observation satellite 4, 6, a geostationary communications satellite 342, acting as a relay for retransmitting the observation data between the at least one moving observation satellite 4, 6 and the at least one "remote or offset" target and receiving ground station 318, 320.

The remote and offset target ground stations 318, 320 are not optically visible from the relay platform 332 due to their distance from the local target ground stations 12, 14, 16, the flyover altitude of the aircraft and the spherical nature of the Earth, but are visible optically and by radio from the geostationary satellite 342. These target ground stations 318, 320, referred to as "remote or offset" target ground stations, that are accessible directly from the geostationary satellite 342, form a second "remote" group of remote or offset target ground stations.

The target ground stations 318, 320 perform the same functions as the local target ground stations 12, 14, 16, in particular decryption with keys and associated indices that are specific to them.

It should, moreover, be noted that the management of security, i.e. the loading of the keys and the transmission of the indices of active keys, is identical for all the stations 12, 14, 18, 318, 320.

Of the remote and offset target ground stations 318, 320, at least one offset target ground station, for example the ground station 320, can act as a transfer ground station, configured to receive telemetry data intended for a local target ground station when the corresponding local link is unavailable, and to retransmit said telemetry data to a desired recipient.

The space observation system 312 differs from the space observation system 2 in that the relay platform 32 is replaced by a relay platform 332 having the same functions as said platform 32 and additional functions.

Figure 7:
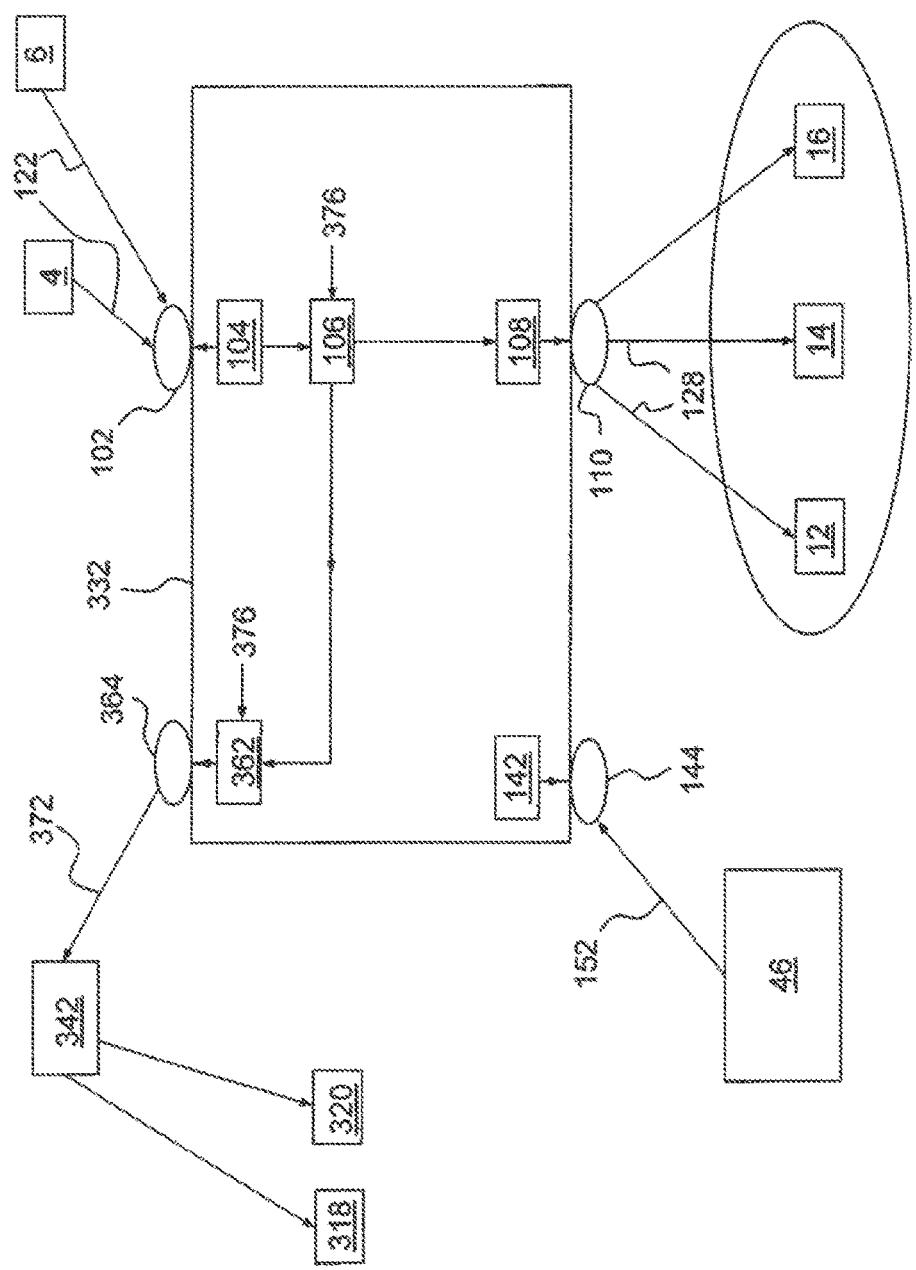
FIG. 7 is a view of the architecture of the relay platform of the invention and its main interfaces with the other elements of the space observation system of FIG. 6.

According to FIG. 7, the relay platform 332 is configured to act as a first relay for transmitting, at a high throughput, observation or telemetry space data between one or more non-geostationary moving observation satellites, in this case the moving observation satellites 4 and 6, and at least one target ground station for receiving said data, in this case the target ground stations 12, 14, 16, 318, 320, the transmission taking place in one or more predetermined visibility windows when the moving observation satellite or satellites 4, 6 is visible to the aircraft 34.

The relay platform 332 comprises a fifth transmission interface 362 and a fifth transmission antenna 364.

The fifth transmission interface 362 is configured to modulate the observation or telemetry data stored in the memory 106, and transmit said modulated telemetry data in a fifth optical or radio frequency band, via the fifth transmission antenna 364, over an "offset" fifth wireless space uplink 372, directly linking the relay platform 332 to the geostationary satellite 342, said geostationary satellite 342 forming a second communication relay with respect to the telemetry data of the observation satellites 4, 6.

The communication relay platform 332 is configured to receive a routing command 376 for the encrypted data before sending it to the ground, the command being generated and transmitted by the first control station 46.

In a nominal mode according to which the transmission over the second local downlink 128 allows sufficient throughput, the second interface 108 is activated and the observation telemetry data is routed by the memory 106 to said second interface 108 and the local receiving stations.

In a control or backup mode according to which the transmission over the second local downlink 128 does not allow sufficient throughput, after a backup mode routing command 376 has been sent by the first control station 46 and received by the relay platform 332, the fifth interface 262 is activated and the observation telemetry data is routed by the memory 106 to said fifth interface 362 and the remote and offset receiving stations 318, 320. The shift from the backup mode to the nominal mode is implemented by the sending of a nominal mode routing command 376 by the first control station 46 and the receiving of said command by the relay platform 332.

Figure 8:
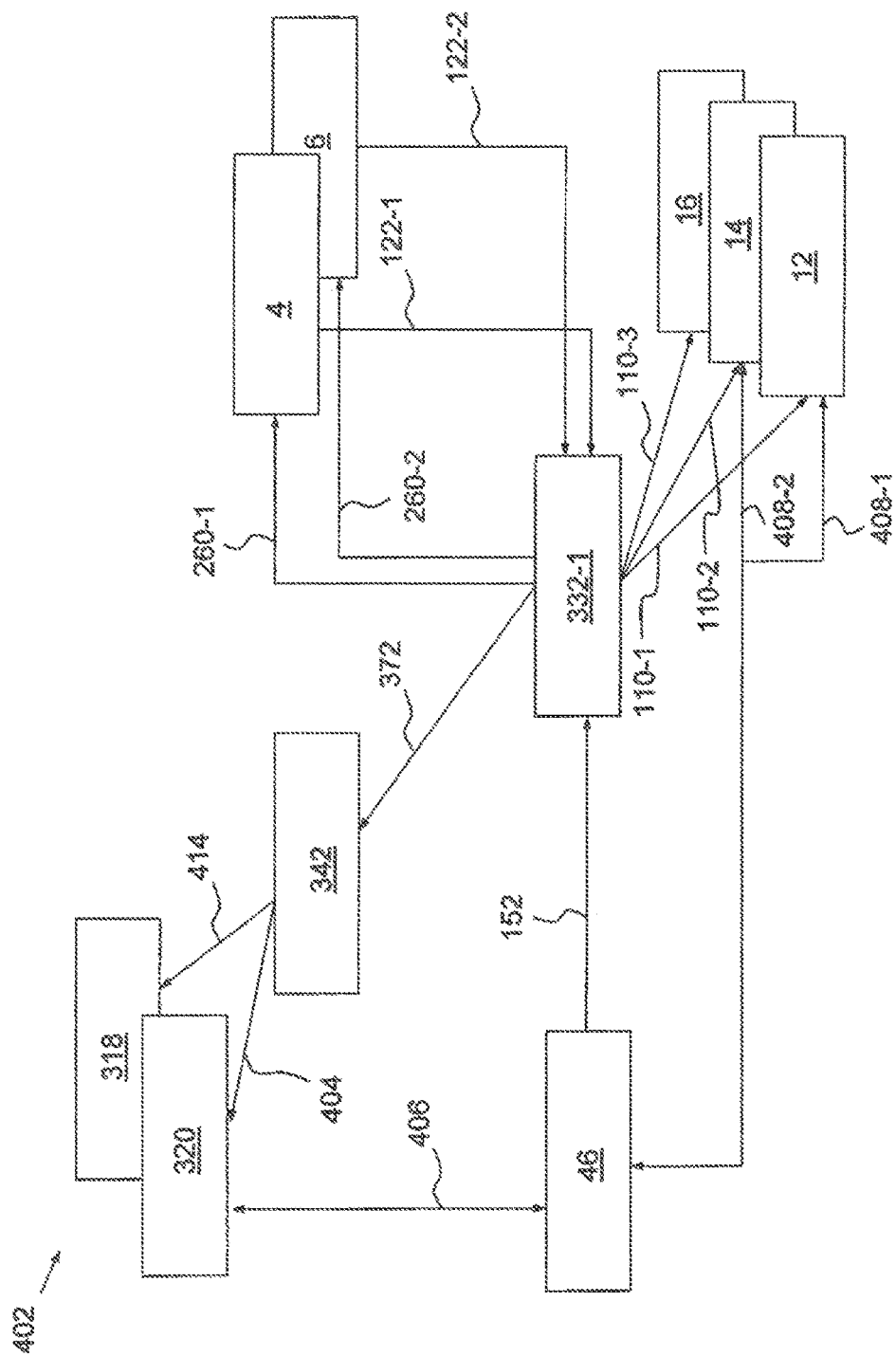
FIG. 8 is a view of a first communications architecture of the space observation system of FIG. 6 in which the relay platform integrates, in an optimum manner, both the security functions concerning the protection of the descending observation telemetry data and the security functions concerning the protection of the ascending telecommands of the moving observation satellites.

According to FIG. 8 and a first communications architecture 402 of the observation system 312 of FIG. 6, the communication system 402 of the observation system 312 uses a version 332-1 of the relay platform 332 which integrates, to a high degree, the functions of securing the telemetry and telecommand data of the observation satellites 4, 6 in the same way as the relay platform 252 of FIG. 4.

In this architecture, the downlinking of secure telemetry data from the observation satellites to the local target stations 12, 14, 16 takes place nominally, below the relay platform 332-1, through two-level links combining, as required, a downlink for telemetry data of the first level 122-1 or 122-2 and a downlink for telemetry data of the second level chosen from the links 110-1, 110-2 and 110-3.

In the backup mode, the downlinking of the encrypted telemetry data from, for example, the moving observation satellite 6 to the local target ground station 12 takes place through the succession of encrypted links 122-2, 132, a link 404 between the geostationary satellite 342 and the offset transfer ground station 20, a first return link 406 between the offset transfer ground station 20 and the ground control center 46, and a second return link 408-2 between the ground control center 46 and the target ground station 12, the second-level encryption of the telemetry data being reported in a transparent manner at the local target ground station 12.

It should be noted that the backup mode via the geostationary satellite is applicable to ground stations outside the visibility of the relay platform, such as the ground stations 318, 320, but can also be applied to any station in the visibility of the satellite without this choice being constrained by environmental conditions.

In the nominal mode, the downlinking of secure telemetry data from the observation satellites to the offset target stations 318, 320 takes place through a two-level encryption link combining, as required, a downlink for telemetry data of the first level 122-1 or 122-2 and a downlink for encrypted telemetry data of the second level chosen from a first combined link including the links 132 and 404 and a second combined link 414 including the link 132 and a second link between the geostationary satellite 42 and the remote target ground station 18.

In this architecture, the uplinking of secure telecommands of the observation satellites, from the ground control center 46 to the observation satellites 4, 6 takes place via the relay platform 332-1 through two-level links combining, as required, the first uplink 152 of the first level and an uplink 260-1 or 260-2 of the two-level uplink for telecommands of the second level.

Figure 9:
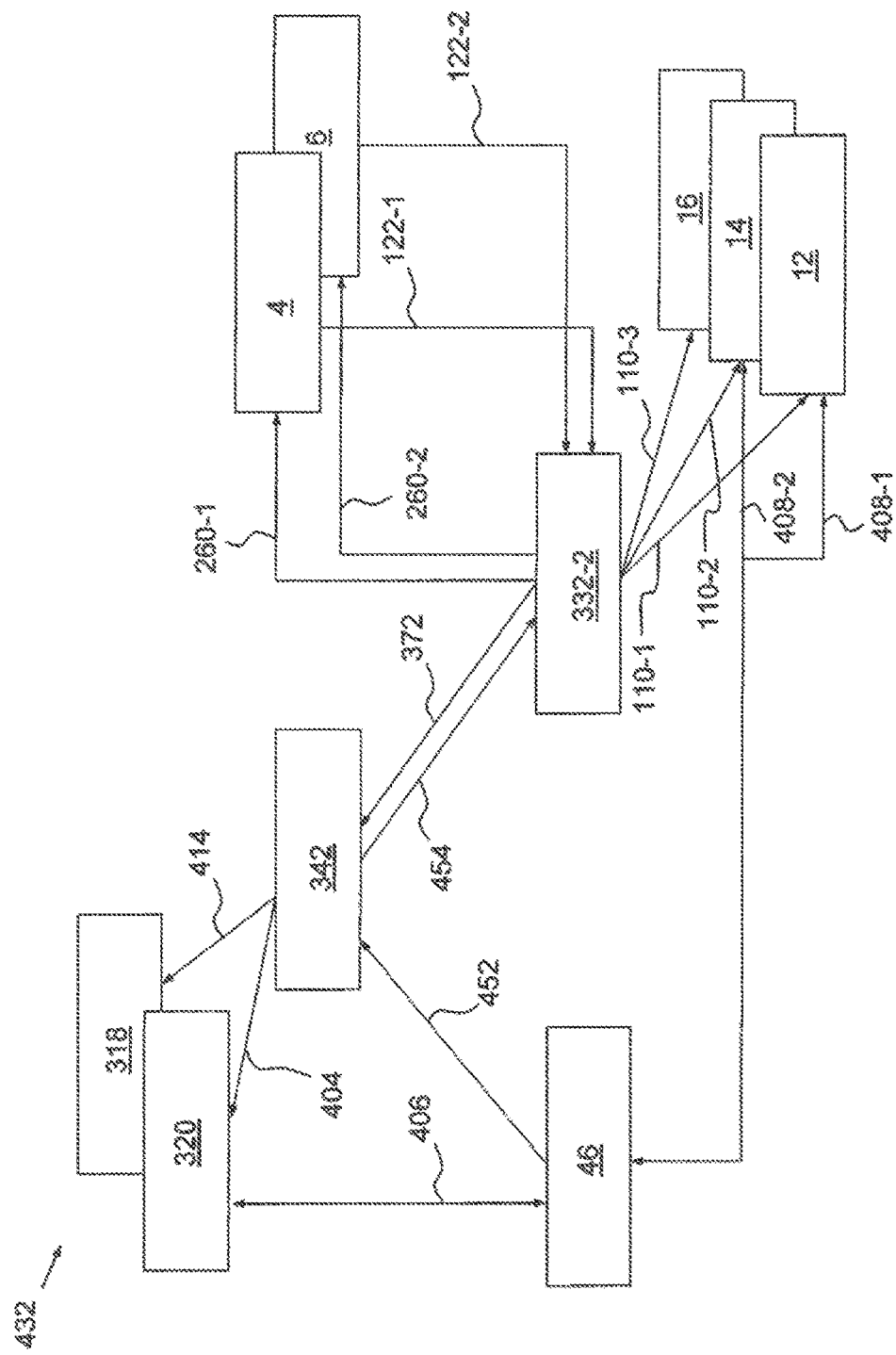
FIG. 9 is a view of a second communications architecture of the space observation system of FIG. 6 in which the relay platform integrates only the securing of the telemetry data of the moving observation satellites and acts only as a transparent relay with respect to the securing of the telecommand data of the observation satellites.

According to FIG. 9 and a second communications architecture 432 of the observation system 312 of FIG. 6, the communication system 432 uses a version 332-2 of the relay platform 332 that integrates only the securing of the telemetry data of the moving observation satellites, in the same way as the relay platform 202 of FIG. 3, and acts only as a transparent relay with respect to the securing of the telecommand data of the observation satellites 4 and 6.

The second communications architecture 432 comprises the same link and telemetry data protection elements as the first communications architecture 402.

The second communications architecture 432 differs from the first communications architecture 402 in that the uplinking of secure telecommands of the observation satellites, from the ground control center 46 to the observation satellites 4, 6 takes place, first via the geostationary satellite through an uplink 452 between the ground control center 46 and the geostationary satellite 342 and a downlink 454 between the geostationary satellite 454 and the relay platform 332-2, then via the relay platform 332-2 and through the uplink 260-1 or the uplink 260-2 intended for the corresponding observation satellite 4 or 6.

The telecommand data of the observation satellites is encrypted at the first ground control center 46 and this encryption of the data is reported in a transparent manner via the geostationary satellite 342 and the relay platform 332-2 at the observation satellites 4 and 6.

Figure 10:
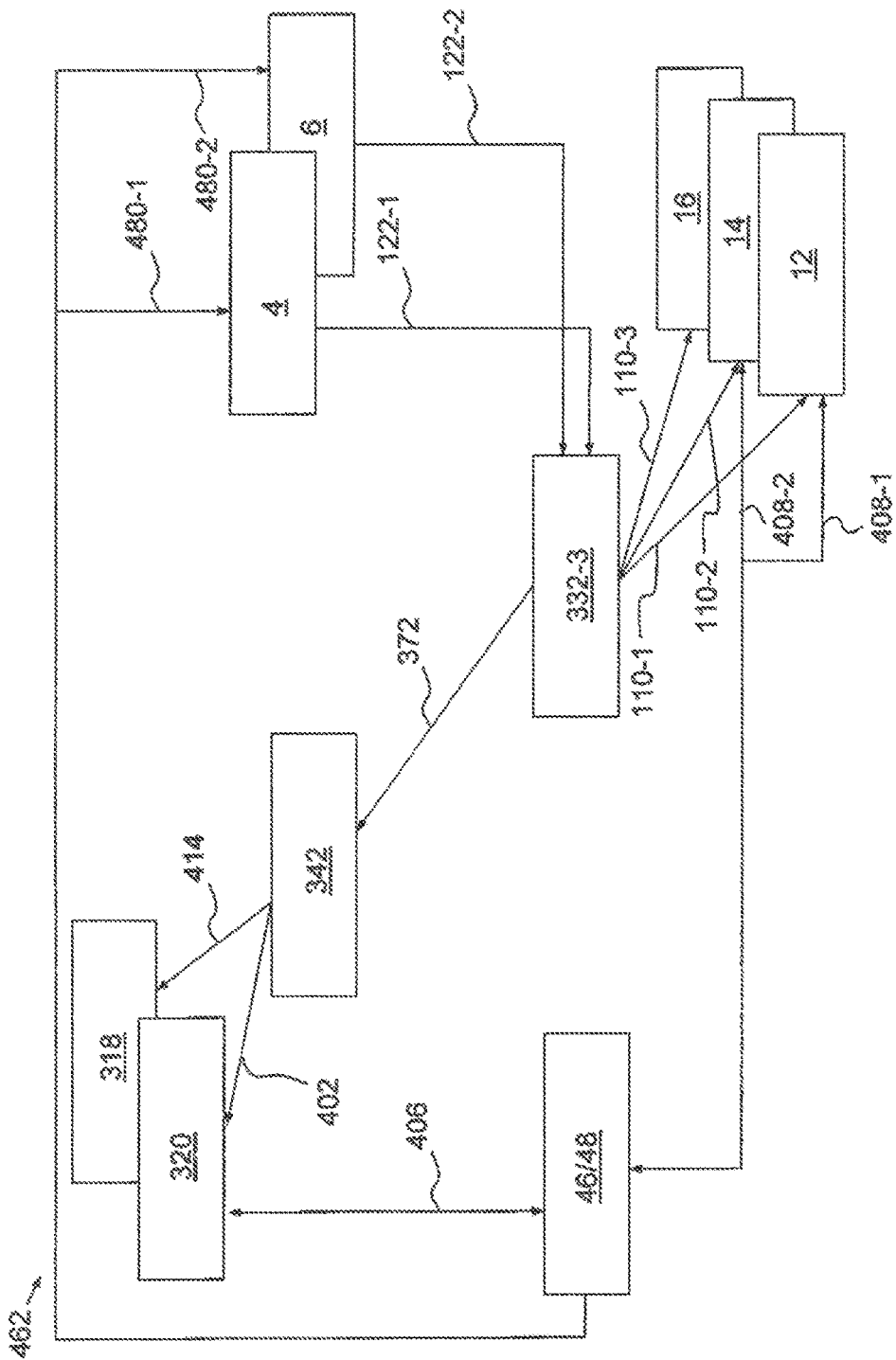
FIG. 10 is a view of a third communications architecture of the space observation system of FIG. 6 in which the relay platform integrates only the securing of the telemetry data of the moving observation satellites and does not participate in the transmission of the telecommand data from the ground control center to the moving observation satellites.

According to FIG. 10 and a third communications architecture 462 of the observation system 312 of FIG. 6, the communication system 462 uses a version 332-3 of the relay platform 332 that integrates only the securing of the telemetry data of the moving observation satellites, in the same way as the relay platform 202 of FIG. 3, and does not participate in the transmission of the telecommand data from the first ground control center 46 or from the second satellite control center 48 to the moving observation satellites 4 and 6.

The third communications architecture 462 differs from the first and second communications architectures 402, 432 in that the uplinking of secure telecommands of the observation satellites 4, 6, from the first ground control center 46 or from the second satellite control center 48 to the observation satellites 4, 6 takes place directly, via a dedicated space uplink 480-1 or 480-2 for telecommands, between the ground control center 46 and the corresponding observation satellite 4 or 6.

Generally, the implementation of a method for protecting the observation telemetry data and the telecommands of the observation satellites by the observation system of FIG. 1 using the platform of FIG. 6 comprises a step of loading sets of encryption/decryption keys executed during a phase of initializing the keys or renewing the keys, and a step of transmitting the indices of the active keys.

The two-level encryption, between the observation satellites and the relay platform, and between the relay platform and the target ground stations, makes it possible to implement, as required:

splitting or redistribution of the telemetry data between the observation satellites and the target ground stations, all combinations being, a priori, possible, each individual link being specifically encrypted.

management, on board the platform, of the allocation of the uplink data (mission plans) to the different observation satellites, which has the effect of reducing the complexity of ground-relay platform transmissions and the securing of same.

management, on board the relay platform, of the allocation of the telemetry data downlinking from the observation satellites to the different ground receiving terminals, via a matrix allocation of this data, all or part of the data of a satellite j being capable of being transmitted to a target ground station k. This allows total modularity in the broadcasting of the telemetry data, combined with the securing of this broadcast.

The invention claimed is:

1. A communication relay platform of a space observation system, configured to be installed on board an aircraft moving above the clouds, and configured to act as a high-altitude relay for transmitting space observation data, referred to as telemetry data, at a high throughput, between at least one non-geostationary moving observation satellite and at least one target ground station for receiving said data, the transmission from the observation satellite or satellites to the high-altitude relay being capable of taking place during one or more predetermined visibility windows when the moving observation satellite or satellites is visible to the aircraft, and the transmission of data from the aircraft to the ground being capable of taking place constantly,
    the relay platform comprising:
    a first receiving antenna, configured to receive, in a first optical or radio frequency band, observation data transmitted over a first wireless space downlink linking at least one moving observation satellite to the relay platform, and
    a first reception interface, connected to the first receiving antenna and configured to demodulate the data received by the first antenna and save it in a memory, and
    a second transmission interface, configured to modulate the observation data stored in the memory, and transmit said modulated data in a second radio frequency band via a second transmission antenna over a second wireless aerial downlink directly linking the relay platform to at least one target ground station, and
    the relay platform being wherein it comprises:
    a first descending two-level decryption/encryption chain for the telemetry data returned from at least one moving observation satellite to the target ground station or stations.

2. The communication relay platform as claimed in claim 1, in which
    the first frequency band of the first wireless space downlink is an optical or radio frequency band, and/or
    the second frequency band of the second aerial downlink is an optical or radio frequency band.

3. The communication relay platform as claimed in claim 1, further comprising:
    a third reception interface configured to demodulate secure telecommand data of the relay platform and/or of the moving observation satellite(s), generated and transmitted over a third dedicated link by a ground control center of the space observation system.

4. The communication relay platform as claimed in claim 1, in which
    the first descending two-level decryption/encryption chain is configured:
    for each moving observation satellite and the corresponding received telemetry data, to decrypt, at a first descending level, said telemetry data, encrypted and transmitted by said moving observation satellite over the first space downlink and demodulated by the first interface, by using active keys for decrypting the telemetry data of the first descending level, associated with said moving satellite and with indices of active keys for encrypting/decrypting the telemetry data of the first descending level, said indices of active encryption/decryption keys being transmitted together with said encrypted telemetry data and being associated, in a unique manner, with said moving observation satellite and with said active decryption keys of the first descending level; then
    for each target ground station and the corresponding telemetry data intended for same, decrypted at the first descending level and originating from one or more observation satellites, to encrypt, at a second descending level, the telemetry data decrypted at the first descending level by using an active key for encrypting the telemetry data of the second descending level, associated with said target ground station, and to append, to said encrypted data of the second descending level, an index of an active key for encrypting/decrypting the telemetry data of the second descending level, associated, in a unique manner, with said target ground station and with said active encryption key of the second descending level.

5. The communication relay platform as claimed in claim 4, in which
    the first descending two-level decryption/encryption chain for the telemetry data, returned from the moving satellite(s) to the target ground station(s), comprises a first module for managing the descending two-level encryption/decryption keys, a second module for decrypting, at a first descending level, the telemetry data transmitted over the first space downlink and demodulated by the first interface, and a third module for encrypting, at a second descending level, the telemetry data decrypted at the first descending level; and
    the first module for managing the descending two-level encryption/decryption keys for the telemetry data is configured to;

initially receive a first group of one or more sets of keys for decrypting telemetry data of the first descending level; and initially receive a second group of one or more sets of keys for encrypting telemetry data of the second descending level; and each set of keys for decrypting telemetry data concerning the first descending level is associated with a moving observation satellite, and each key for decrypting telemetry data at the first descending level of each set is paired with and identified in a unique manner by an index of an encryption/decryption key of the first descending level; and each set of keys for encrypting telemetry data concerning the second descending level is associated with a target ground station, and each key for encrypting telemetry data at the second descending level of each set is paired with and identified in a unique manner by an index of an encryption/decryption key at the second descending level.

6. The communication relay platform as claimed in claim 5, in which the first module for managing the descending two-level encryption/decryption keys for the telemetry data is configured to execute, on receipt, via the third interface, of dedicated telecommands secured and sent by the ground control center, modifications of part or all of the keys for decrypting the telemetry data at the first descending level and/or the keys for encrypting telemetry data at the second descending level.

7. The communication relay platform as claimed in claim 4, in which the first receiving antenna, the first reception interface and the memory are configured to separately receive, demodulate and save telemetry data, encrypted at the first descending level and transmitted by at least two non-geostationary moving observation satellites over the first space downlink, and/or the second transmission antenna and the second transmission interface are configured to separately modulate and transmit the telemetry data encrypted at the second descending level to at least one target ground station over the second wireless aerial downlink; and the first descending two-level decryption/encryption chain for the telemetry data, returned from the moving satellite(s) to the target ground station(s), comprises a matrix allocator for allocating the decrypted telemetry data, received from a given moving observation satellite, to different target ground stations, according to an allocation table loaded with telecommands, the matrix allocator being connected in series between the second decryption module and the third encryption module.

8. The communication relay platform as claimed in claim 1, further comprising:

a second ascending two-level decryption/encryption chain for the telecommand data of the moving observation satellite(s) received via the third reception interface of the third dedicated link for secure telecommands originating from the ground control center.

9. The communication relay platform as claimed in claim 8, in which the second ascending two-level decryption/encryption chain for the telecommand data of the moving observation satellite(s) is configured:

for each moving target observation satellite and the corresponding telecommand data of said satellite, to decrypt, at a first ascending level, the telecommand data transmitted by the ground control center over the third link and demodulated by the third interface, by using an active key for decrypting the telecommand data of the first ascending level, associated with said observation satellite and with an index of an active key for encrypting/decrypting the telecommand data of the first ascending level, said index of the active key for encrypting/decrypting the telecommand data being transmitted together with the encrypted telecommand data by the ground control center and being associated, in a unique manner, with the moving satellite and with said decryption key of the first ascending level; then for each moving target observation satellite and the decrypted telecommand data intended for it, to encrypt, at a second ascending level, the telecommand data decrypted at the first ascending level by using an active key for encrypting the telecommand data of the second ascending level, the active key for encrypting the telecommand data of the second ascending level being associated with the target observation satellite, and to append, to said telecommand data of the second ascending level, an index of an active key for encrypting/decrypting telecommands, associated, in a unique manner, with said observation satellite and with said active encryption key of the second ascending level.

10. The communication relay platform as claimed in claim 9, further comprising:

a fourth transmission interface, configured to modulate telecommand data of at least one moving observation satellite, and transmit said modulated telecommand data via a fourth transmission antenna over a fourth wireless space uplink directly linking the relay platform to the moving observation satellite(s);

and in which the second ascending two-level decryption/encryption chain for the telecommand data of the moving observation satellite(s) comprises a fourth module for managing the ascending two-level encryption/decryption keys, a fifth module for decrypting, at a first ascending level, the telecommand data transmitted over the third link and demodulated by the third interface, and a sixth module for encrypting, at a second ascending level, the telecommand data decrypted at the first ascending level; and the fourth module for managing the ascending two-level encryption/decryption keys for the telecommands of the moving satellite(s) is further configured to;

initially receive a third group of one or more sets of keys for decrypting telecommands of the first ascending level, initially receive a fourth group of one or more sets of keys for encrypting telecommands of the second ascending level; and each set of keys for decrypting telecommands concerning the first ascending level is associated with a moving observation satellite, and each key for decrypting telecommand data at the first ascending level of each set is paired with and identified in a unique manner by an index of an encryption/decryption key of the telecommand data at the first descending level; and each set of keys for encrypting telecommands concerning the second ascending level is associated with a moving target observation satellite, and each key for encrypting telecommand data at the second ascending level of each set is paired with and identified in a unique manner by an index of an encryption/decryption key at the second ascending level.

11. The communication relay platform as claimed in claim 10, in which
the fourth module for managing the two-level encryption/decryption keys for the telecommand data of the moving satellite(s) is configured to execute, on receipt, via the third interface, of dedicated telecommands secured and sent by the ground control center, modifications of part or all of the keys for decrypting the telecommand data at the first ascending level and/or the keys for encrypting telecommand data at the second ascending level.

12. The communication relay platform as claimed in claim 1, further comprising:
a fifth transmission interface, configured to modulate the observation data stored in the memory, and transmit said modulated data in a fifth optical or radio frequency band, via a fifth transmission antenna, over a fifth wireless space uplink directly linking the relay platform to a geostationary satellite,
the memory being configured to route the telemetry data, in a manner controlled from the ground by sending a dedicated command, over the fifth transmission interface, instead of the second transmission interface which is taken as the destination port in a nominal mode.

13. A space system comprising at least one non-geostationary moving observation satellite, at least one target ground station for receiving observation data transmitted at a high throughput by the at least one observation satellite, an aircraft moving at an altitude higher than the clouds, and a communication relay platform, installed on board the aircraft and acting as a relay for transmitting the observation or telemetry data between the at least one observation satellite and the at least two target ground stations for receiving the data, in which
the communication relay platform is defined as claimed in claim 1, and
the aircraft is included in the group made up of drones, steerable stratospheric balloons or airplanes.

14. The space system as claimed in claim 13, further comprising a geostationary satellite and at least one remote and offset ground station, connected to said geostationary satellite by a geostationary space downlink, and in which
the relay platform comprises a fifth transmission interface, configured to modulate the observation data stored in the memory, and to transmit, in a fifth optical or radio frequency band, said modulated data via a fifth transmission antenna over a fifth wireless space uplink directly linking the relay platform to a geostationary satellite,
the memory being configured to route the telemetry data, in a manner controlled from the ground by sending a dedicated command, over the fifth transmission interface, instead of the second transmission interface which is taken as the destination port in a nominal mode.

\* \* \* \* \*